March 8, 1932. F. BÖNNEMANN 1,848,156
TREATING COAL GASES
Filed Nov. 29, 1929
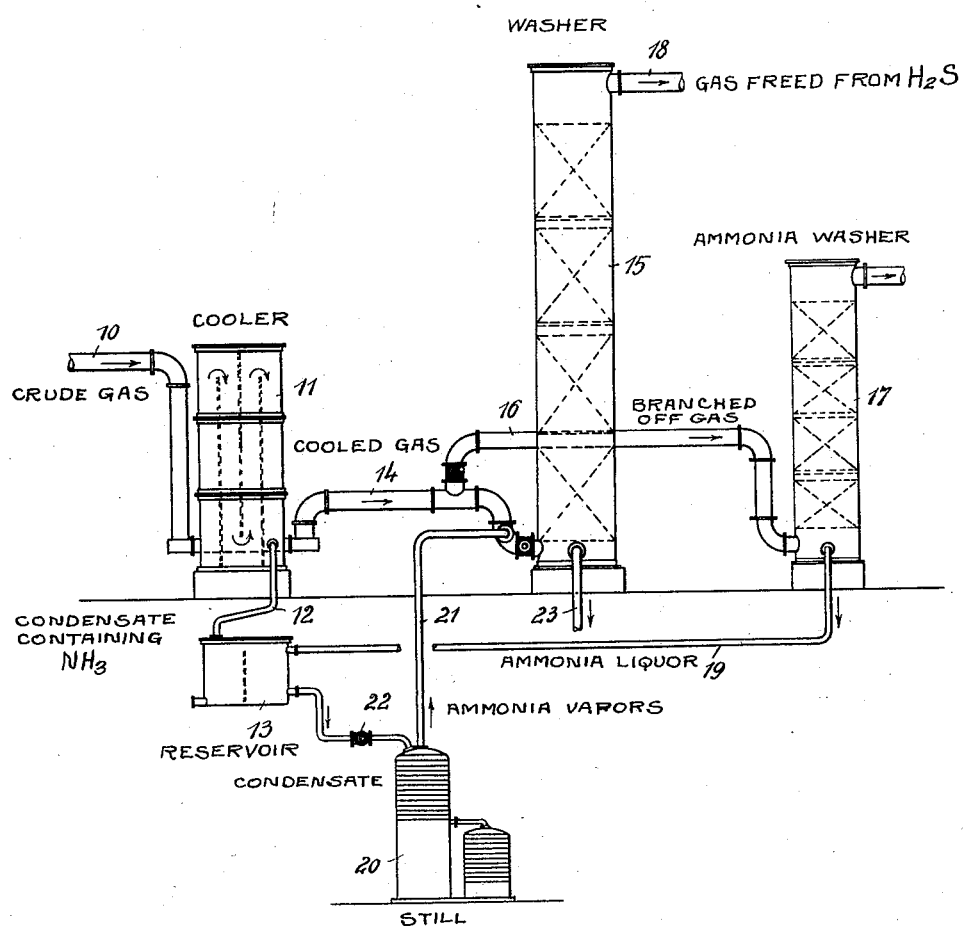
Inventor:
Franz Bönnemann
Atty.

Patented Mar. 8, 1932

1,848,156

UNITED STATES PATENT OFFICE

FRANZ BÖNNEMANN, OF ESSEN-RUHR, GERMANY, ASSIGNOR, BY MESNE ASSIGNMENTS, TO THE KOPPERS COMPANY, OF PITTSBURGH, PENNSYLVANIA, A CORPORATION OF DELAWARE

TREATING COAL GASES

Application filed November 29, 1929, Serial No. 410,586, and in Germany February 4, 1928.

My invention, for which application for patent has been filed in Germany Feb. 4, 1928, refers to the treatment of industrial gases with a view to separating and recovering therefrom the ammonia, hydrogen sulfide and other valuable matter contained in these gases. It has particular reference to the purification of coal and coke oven gases and to the recovery therefrom of the valuable by-products contained therein.

In the processes hitherto known for recovering hydrogen sulfide contained in coal distillation gases such as for instance coke oven gases means have been provided for combining the hydrogen sulfide with the ammonia contained in the gas which is thus freed from sulfur. The processes operating on this principle have proved to be satisfactory as long as the ratio of the ammonia to the hydrogen sulfide is 2:1. On the other hand, if ammonia and hydrogen sulfide are present in the gas in a different ratio, for instance if hydrogen sulfide is present in excess, these processes will either fail or it will be extremely difficult to carry them through. In this case all that can be done is to add to the gas under treatment a quantity of ammonia which restores the ratio of 2 ammonia to 1 hydrogen sulfide. Obviously this quantity of ammonia not being available as a rule must be bought and paid for.

It is an object of my invention to separate from the gases all the ammonia contained therein, at the same time causing one part hydrogen sulfide to combine with two parts of this ammonia, so that only this quantity of hydrogen sulfide is recovered. In order to effect this, a quantity of gas corresponding to the surplus of hydrogen sulfide contained in the gas beyond the proportion of 2 ammonia to 1 hydrogen sulfide is branched off before effecting the combination of the ammonia and the hydrogen sulfide, and the ammonia contained in the branch current of gas is then returned into the main current. I thus obtain in the simplest manner the proportion of 2 ammonia to 1 hydrogen sulfide, while the gas in the branch current which has thus been freed from its ammonia, may be utilized for other purposes.

Assuming for instance that the gas coming from the ovens contains 11,1 grams hydrogen sulfide and 8,4 grams ammonia per cubic metre (this being about the percentage of hydrogen sulfide and ammonia in the coke oven gases produced in the Ruhr district) then the main gas current contains about 32,2 per cent hydrogen sulfide in excess of the double equivalent of ammonia. I now branch off 24,3 per cent of the gases and return the ammonia contained therein into the main gas current which then contains 8,4 grams ammonia and 8,2 grams hydrogen sulfide in 0,757 cubic metres. In this manner about 75 per cent of the hydrogen sulfide and all the ammonia contained in the gas are recovered. The branch gas current freed from its ammonia may then be treated in some suitable manner.

As before combining ammonia and hydrogen sulfide the gases must be cooled in order to separate the tar, I prefer branching off part of the gas current only after the gas has been cooled. From the branch current the ammonia which has separated out in consequence of the low temperature and has partly combined with the acids in the gas, is driven out in a well known manner by acting on the gas with milk of lime and distilling the ammonia thus liberated in a steam current, the ammonia being then returned into the main gas current. The branch current is subjected to a washing operation in order to recover the ammonia still contained therein which is passed into the still and thus returned into the main gas current.

I have found that my invention is applicable with particular advantage to gas producers, from which the gas shall be supplied to the consumers free from hydrogen sulfide, while part of the gas is required for heating purposes in the producer plant itself or for other purposes in which the presence of hydrogen sulfide is innocuous. The new method is particularly valuable in the case where all the ammonia is washed out from the gas and the hydrogen sulfide is utilized for the formation of ammonium sulfate. If in this case the branch current containing the rest of hydrogen sulfide is utilized for heating the gas producers or ovens, about 50 per cent of the gas produced being as a rule required for this purpose, further 25,7 per cent of purified gas must be supplied to the branch current by all means, so that the percentage of hydrogen sulfide in the gas utilized for heating the furnaces or ovens is reduced to about 50 per cent. In this case in which for instance only 50 per cent of the total gas available shall be freed from hydrogen sulfide, the remaining surplus of ammonia may also be utilized for partly freeing the rest of the gas from hydrogen sulfide in accordance with the surplus of ammonia.

In case that it should prove necessary—for instance where the ovens are heated with gas produced elsewhere so that all the gas produced in the ovens can be subjected to treatment—to free all the gas from hydrogen sulfide in the simple conversion plants available for this purpose, I can do so in accordance with my invention by freeing the branch current from the hydrogen sulfide contained therein by well known means, for instance by dry purification with bog iron ore or the like, the hydrogen sulfide thus recovered being thereafter returned into the main gas current, preferably before this latter enters the hydrogen sulfide washers. In order to be able to effect the branching off of part of the gas in accordance with the conditions prevailing in each individual case, it is merely necessary to choose the quantity of gas to be branched off in proportion to the average ratio of hydrogen sulfide to ammonia in the gas produced from the coal under treatment. Any variations in this proportion may be provided for by causing the washing liquor used in the hydrogen sulfide extracting operation to contain a small quantity of ammonia by adding the required quantity of ammonia liquor if necessary.

In the drawing affixed to this specification and forming part thereof an apparatus for carrying out this invention is illustrated diagrammatically by way of example.

As shown in the drawing, the crude gas flows through the pipe 10 into the cooler 11. The condensate separating out in the cooler and containing ammonia flows through pipe 12 into the reservoir 13, the cooled gas flows through pipe 14 into the washer 15 in which the surplus shall be removed. However before entering the washer part of the gas is branched off by means of automatically active devices of a well known kind and flows through pipe 16 into the ammonia washer 17. The ammonia liquor escaping from this washer flows through pipe 19 into the reservoir 13, while the gas freed from hydrogen sulfide escapes through pipe 18. The condensate from the reservoir 13 flows in a quantity regulated by a valve 22 into the still 20 and the ammonia vapors developed in this still pass through pipe 21 back into the main gas current in the pipe 14 before the gas has entered the washer 15. The liquor containing the hydrogen sulfide and ammonia escapes from the washer 15 through pipe 23 for further treatment, for instance according to the methods disclosed in the German patent specifications 272,475 and 237,607 by bringing the liquor in contact with a solution containing thionates, such as the thionates of ammonium, iron, manganese or zinc, the reactions occurring for instance according to the equations

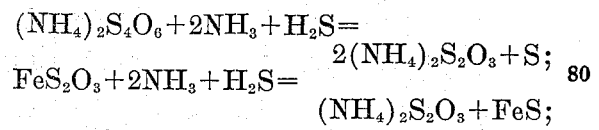

The ammonium thiosulfate resulting in either one of these reactions is separated from the elementary sulfur or the insoluble sulfur compounds and treated with $SO_2$ according to the equation

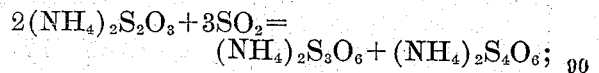

Preferably the treatment with $SO_2$ is carried through in such manner that only part of the thiosulfate is converted into polythionate. On heating the liquor containing thiosulfate and polythionate, ammonium sulfate and sulfur are formed according to the equation

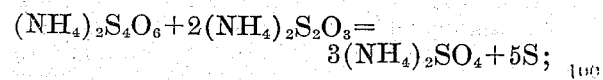

After removal of the sulfur the ammonium sulfate solution is concentrated by evaporation, pure crystallized ammonium sulfate being thus obtained.

This process is applicable with advantage in all the cases, where a surplus of hydrogen sulfide is present in the gas produced in the retorts or ovens. It has proved to be particularly useful whenever it is desired to recover ammonium sulfate by means of the hydrogen sulfide contained in the gas and the ammonia recovered in an ammonia recovery plant connected with the gas producers. For in such a case the ammonia washers forming part of the ammonia plant can be utilized for this process.

Various changes may be made in the details disclosed in the foregoing specification without departing from the invention or sacrificing the advantages thereof.

I claim:—

1. The method of removing from industrial gases containing hydrogen sulfide and ammonia in the proportion of more than one mol. $H_2S$ to two mols. $NH_3$, all the ammonia with part of the hydrogen sulfide to obtain a gas free of $H_2S$ and $NH_3$ and a gas free of $NH_3$, comprising dividing the quantity of gas to be treated into two parts, recovering ammonia from one of these parts, adding such ammonia to the other part to establish therein the proportion of 1H$_2$S to 2NH$_3$ and causing combination of H$_2$S and NH$_3$ in this part.

2. The method of removing from industrial gases containing hydrogen sulfide and ammonia in the proportion of more than one mol. H$_2$S to two mols. NH$_3$, all the ammonia with part of the hydrogen sulfide to obtain a gas free of H$_2$S and NH$_3$ and a gas free of NH$_3$, comprising dividing the quantity of gas to be treated into two parts, one part containing the quantity of NH$_3$ required to fill up the ammonia in the other part so as to establish in said other part the proportion of 1H$_2$S to 2NH$_3$, recovering the ammonia from said one part, adding the ammonia thus recovered to said other part and causing combination of H$_2$S and NH$_3$ in this part.

3. The method of removing from industrial gases containing hydrogen sulfide and ammonia in the proportion of more than one mol. H$_2$S to two mols. NH$_3$, all the ammonia with part of the hydrogen sulfide to obtain a gas free of H$_2$S and NH$_3$ and a gas free of NH$_3$, comprising cooling the gas to separate out the tar contained therein, dividing the quantity of gas to be treated into two parts, one part containing the quantity of NH$_3$ required to fill up the ammonia in the other part so as to establish in said other part the proportion of 1H$_2$S to 2NH$_3$, recovering the ammonia from said one part, adding the ammonia thus recovered to said other part and causing combination of H$_2$S and NH$_3$ in this part.

4. The method of removing from industrial gases containing hydrogen sulfide and ammonia in the proportion of more than one mol. H$_2$S to two mols. NH$_3$, all the ammonia with part of the hydrogen sulfide to obtain a gas free of H$_2$S and NH$_3$ and a gas free of NH$_3$, comprising branching off from the gas that quantity which contains the surplus of hydrogen sulfide beyond the ratio of 2 parts ammonia to 1 part hydrogen sulfide, recovering the ammonia contained in the branched off gas portion, returning said ammonia into the main body of gas, freeing the branched off gas separately from the hydrogen sulfide contained therein and returning the gas which has thus been freed from ammonia and hydrogen sulfide, into the main body of gas.

5. The method of removing from industrial gases containing hydrogen sulfide and ammonia in the proportion of more than one mol. H$_2$S to two mols. NH$_3$, all the ammonia with part of the hydrogen sulfide to obtain a gas free of H$_2$S and NH$_3$ and a gas free of NH$_3$, comprising branching off from the gas that quantity which contains the surplus of hydrogen sulfide beyond the ratio of 2 parts ammonia to 1 part hydrogen sulfide, recovering the ammonia contained in the branched off gas portion, returning said ammonia into the main body of gas, freeing the branched off gas separately from the hydrogen sulfide contained therein and returning the gas which has thus been freed from ammonia and hydrogen sulfide, into the main body of gas and treating said main body of gas with a slightly ammoniacal washing liquor to free same from sulfur.

In testimony whereof I affix my signature.

FRANZ BÖNNEMANN.